(No Model.)  2 Sheets—Sheet 1.
J. H. COOPER.
BEARING AND ITS SUPPORT.
No. 499,012.  Patented June 6, 1893.
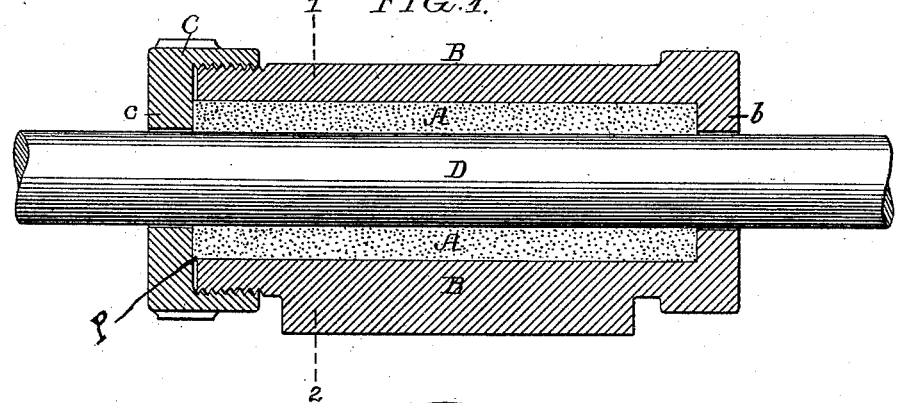
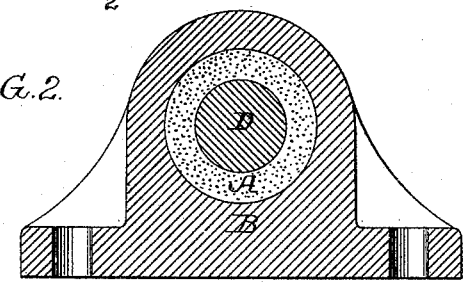
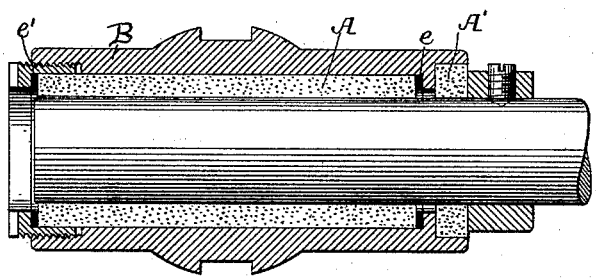
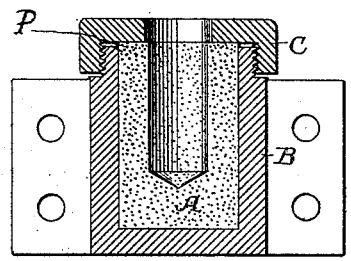
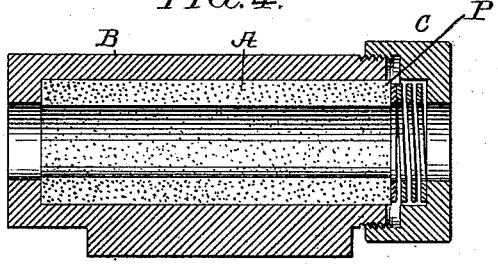
Witnesses:
William D. Conner
Hamilton D. Turner
Inventor:
John H. Cooper
By his Attorneys
Howson & Howson (No Model.) 2 Sheets—Sheet 2.
J. H. COOPER.
BEARING AND ITS SUPPORT.
No. 499,012. Patented June 6, 1893.
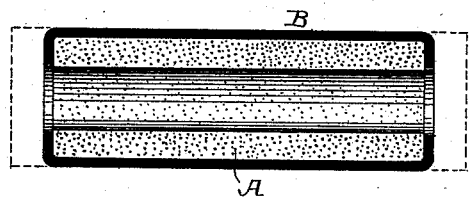
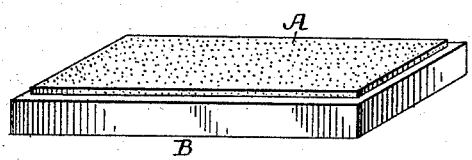
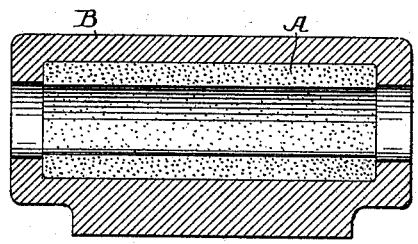
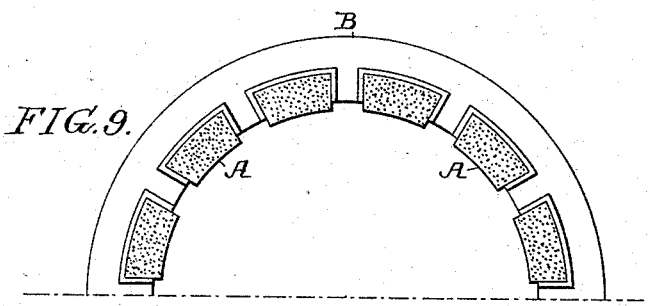
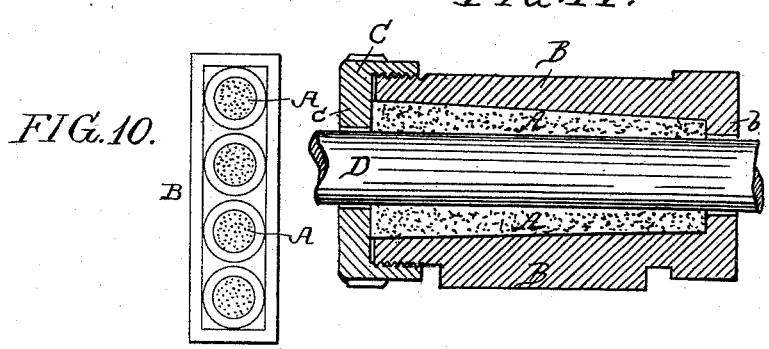
Witnesses:
William D. Conner
Hamilton D. Turner
Inventor:
John H. Cooper
By his Attorneys
Howson & Howson

UNITED STATES PATENT OFFICE.

JOHN H. COOPER, OF PHILADELPIHA, PENNSYLVANIA.

BEARING AND ITS SUPPORT.

SPECIFICATION forming part of Letters Patent No. 499,012, dated June 6, 1893.

Application filed September 28, 1892. Serial No. 447,119. (No model.)

*To all whom it may concern:*

Be it known that I, JOHN H. COOPER, a citizen of the United States, and a resident of Philadelphia, Pennsylvania, have invented certain Improvements in Bearings and their Supports, of which the following is a specification.

The object of my invention is to prevent non-metallic self-lubricating materials used for bearings and analogous purposes changing form, fracturing and separating when the same are used. I have found by repeated experiments that a certain class of composition bearings in which graphite forms a principal part, frequently crack, separate and disintegrate after being in use for a certain length of time, owing to the pressure and vibration of the machinery. In journal bearings of this character I have found that the cracks or fissures are transverse to the line of the bearing, owing to the manner in which they are molded and compressed; and the main object of my invention is to prevent bearings of this character from cracking and disintegrating.

I do not include in my invention the filling of cavities in prepared metallic bearings with any self-lubricating material placed in the same in a dry powdered or semi-fluid state.

My invention relates to bearings which are first compressed, shaped and hardened, and after they are finished as bearings, are placed in suitable holders, and I so stamp and compress them by said holders as to preserve them intact, thus preventing this cracking or disintegrating, and further I do not intend that any part of the metallic casing shall come in contact with the shaft or moving part, but the whole support of the shaft or moving part shall be supplied by the self-lubricant bearing. My bearings are thus placed under initial tension or compression and held under compression by the caps or securing parts.

In the experience with bearings it is frequently observed that sufficient heat is evolved, during the motion of the machine, that will loosen the bearings, if of different material from their holders, the several parts of such composite bearings being differently expanded by the same degrees of heat. Now in order to compensate for changes of dimension incident to this cause, I provide an elastic support or abutment at the end or ends of the lubricating bearing in the form of washers made of vegetable material such as cork, fiber, or india-rubber in some cases, and in the form of spiral springs made of metal in others.

In the accompanying drawings:—Figure 1, is a longitudinal sectional view of my improved bearing support, the bearing being mounted therein. Fig. 2, is a transverse sectional view on the line 1—2, Fig. 1. Fig. 3, is a longitudinal sectional view of the preferred form of holder. Figs. 4, 5, and 6, are views showing different forms of boxes. Fig. 7, is a perspective view of a flat bearing used as a sliding bearing. Fig. 8, is a sectional view showing a bearing with the holder cast around it according to my invention. Fig. 9, is a view of a sectional bearing; and Fig. 10, is a view of one of the sections detached. Fig. 11 is a view of my bearing applied to a tapered casing.

A is a composition bearing composed of plumbago and a suitable binding material which can be made into a homogeneous mass, compressed and hardened. This bearing in the present instance, as shown in Figs. 1 and 2, is in the form of a tube and is adapted to fit snugly upon the shaft D. B is the casing or box in which the composition bearing is placed, the bearing fitting the box snugly. The box has an annular flange $b$ at one end, leaving an opening a trifle larger than the shaft, so that the shaft can revolve freely without coming in contact with the casing. The bearing A abuts this flange $b$, and is confined or compressed longitudinally within the casing by a cap C having a flange $c$; the cap is screw threaded and adapted to the screw threaded portion of the casing. Thus when the bearing is placed within the casing and the cap applied, the bearing is confined between the cap and the flange $b$ of the casing preventing the bearing from cracking transversely. As the bearing in the present instance is so molded and compressed that if it shows any fissures at all they run transversely to the line of the bearing, if the bearing should shrink at any time while in service the cap can be taken up thus keeping sufficient tension or compression at all times upon the material.

In Fig. 5 I have shown the same construction as shown in Fig. 1, only the bearing in this instance is a step bearing.

In Fig. 3, I have illustrated a box or casing swiveled in any suitable manner so as to accommodate the bearing to the line of the shaft and in this figure I have shown mounted between the box and one end of the bearing an elastic washer $e$ made of any suitable material, and I have also shown an elastic washer $e'$ between the cap and the end of the bearing; these washers I find allow for the expansion and contraction of the metal and have sufficient tension to prevent the bearing from parting as well as from turning within the box or casing.

It will be observed that the composition bearing is shown projecting beyond one end of the metallic casing as at P, (see Figs. 1, 4 and 5,) which allows the bearing to be compressed readily upon the application of the cap or confining part and also prevents the shaft or moving part from coming in contact with the metallic casing as hereinbefore explained. By clamping the ends of the bearing, as shown, I prevent its turning with the shaft and thus avoid the use of set screws, which compress, puncture, and which are liable to break and destroy the bearing.

In Fig. 3 I have shown a graphite collar $A'$ mounted in the end of the casing to be used as a thrust bearing for a sleeve or collar on the shaft.

In place of the washers shown in Fig. 3, I may use a spiral spring or springs S of metal as shown in Fig. 4, either between the cap and bearing or between the casing and bearing, or both.

In Fig. 6 I have shown a bearing mounted within a tube or a casing of thin soft metal having the ends spun or turned down over the ends of the bearing in such a manner as to put sufficient pressure upon the bearing to prevent its cracking; this sleeve can also be mechanically compressed or heat-shrunk upon the bearing so as to confine it laterally as well as longitudinally.

In Fig. 7 I have shown a sliding bearing. This bearing is confined in a metallic box, the sides extending up nearly to the surface of the bearing, and the edges of the bearing may be tapered as shown in Fig. 11, the sides of the box being so compacted as to put pressure upon and prevent disintegration of the bearing. This box in some instances, may be cast upon the bearing, and as the casting shrinks it will compress and confine the bearing. The bearing may be a journal bearing as shown in Fig. 8, in which the whole casing may be cast around the bearing, or it may be in the form of a cast metal tubular case, which is adapted to the final bearing support.

In Fig. 9, I have shown a sectional bearing made up of a series of sections, each section confined within its own case, and the cases adapted to slide in ways in the bearing support. These sections may be single sections extending the full length of the bearing, or may be made up of a series of quadrangular sections, or a series of circular sections confined by rings which in turn are mounted upon the independent slides adapted to the bearing proper as shown in Fig. 10.

It will be understood by the above description that I do not claim a bearing which is molded within a casing, but

What I claim is—

1. The process herein described of manufacturing bearings, &c., said process consisting in making the bearing proper of self-lubricating material shaped and hardened and initially compressed, then compressing the same by applying a holder thereto which permanently confines the bearing preventing it cracking and disintegrating, substantially as described.

2. The combination of a solidified and shaped composition bearing under initial tension, with a casing confining said bearing by direct pressure applied to the bearing by said casing, substantially as described.

3. The combination of a solidified, shaped and hardened composition bearing under initial tension or compression, with a confining casing applied thereto and exerting pressure upon the bearing both transversely and longitudinally preventing the bearing from cracking and disintegrating, substantially as described.

4. The combination of the compression composition bearing, the box therefor, the flanges for confining the bearing longitudinally, with yielding material between the end of the bearing and the box, so as to allow for the contraction and expansion of the metal, substantially as specified.

In testimony whereof I have signed my name to this specification in the presence of two subscribing witnesses.

JOHN H. COOPER.

Witnesses:
WILLIAM D. CONNER,
JOSEPH H. KLEIN.